(12) United States Patent
Kito et al.

(10) Patent No.: US 9,545,845 B2
(45) Date of Patent: Jan. 17, 2017

(54) FUELING DEVICE

(71) Applicant: TOYODA GOSEI CO., LTD., Kiyosu-shi, Aichen-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 49 days.

(21) Appl. No.: 14/641,779

(22) Filed: Mar. 9, 2015

(65) Prior Publication Data
US 2015/0343897 A1 Dec. 3, 2015

(30) Foreign Application Priority Data

May 28, 2014 (JP) .................................. 2014-109782
Feb. 17, 2015 (JP) .................................. 2015-028282

(51) Int. Cl.
*B60K 15/04* (2006.01)
*B60K 15/03* (2006.01)

(52) U.S. Cl.
CPC ....... *B60K 15/04* (2013.01); *B60K 2015/0346* (2013.01); *B60K 2015/047* (2013.01); *B60K 2015/0461* (2013.01); *B60Y 2306/01* (2013.01)

(58) Field of Classification Search
CPC ............ B60K 15/04; B60K 2015/0461; B60K 2015/0346; B60K 2015/047; B60Y 2306/01
USPC ...... 220/DIG. 33, 86.2, 86.3, 86.1; 141/348, 141/312, 350, 302, 311 R, 349; 137/588
See application file for complete search history.

(56) References Cited

U.S. PATENT DOCUMENTS

| 5,690,153 A * | 11/1997 | Steinkaemper ........ B60K 15/04 141/312 |
| 6,474,376 B2 | 11/2002 | Hagano et al. |
| 8,807,375 B2 * | 8/2014 | Nicosia .................... B62J 35/00 220/293 |

(Continued)

FOREIGN PATENT DOCUMENTS

| JP | H04-108035 A | 4/1992 |
| JP | 2001-088858 A | 4/2001 |

*Primary Examiner* — Robert J Hicks
*Assistant Examiner* — Kareen Thomas
(74) *Attorney, Agent, or Firm* — Posz Law Group, PLC

(57) ABSTRACT

A fueling device comprises a resin passage-forming member configured to form a fuel path, a fuel path end member and a covering member. A resin sealing member constituting the fuel path end member is located on a filler port side of the fuel path and is welded to the passage-forming member about an axis of the fuel path to provide a seal against the passage-forming member by welding about the axis. The covering member is arranged to cover a welded part about the axis at which the sealing member is welded to the passage-forming member from outside of the fuel path with leaving a gap about the axis, which is formed between the welded part and the covering member and is divided into a plurality of sections. The covering member is protruded from an outer peripheral wall of the passage-forming member and is supported by the outer peripheral wall such as to form the gap. The covering member is linked with the outer peripheral wall of the passage-forming member by linkage sections formed between adjacent sections of the gap divided into the plurality of sections. This configuration suppresses deformation of a welded part between a pipe main body and an inner member by an external force.

19 Claims, 11 Drawing Sheets

(56) References Cited

U.S. PATENT DOCUMENTS

2002/0092581 A1* 7/2002 Hagano .................. B60K 15/04
141/348

* cited by examiner

FUELING DEVICE

CROSS-REFERENCE TO RELATED APPLICATION

The present application claims priority from Japanese application P2014-109782 filed on May 28, 2014 and Japanese application P2015-28282 filed on Feb. 17, 2015, the contents of which are hereby incorporated by reference into this application.

TECHNICAL FIELD

The invention relates to a fueling device.

DESCRIPTION OF RELATED ART

A known configuration of a fueling device for an automobile uses a resin filler neck as described in, for example, JP 2001-88858A. The filler neck includes a resin pipe main body, a cap arranged to open and close an opening of the pipe main body, a resin inner member mounted in the pipe main body and a flap valve arranged to open and close a filler port provided in the inner member. An outer periphery of the inner member is fixed to the pipe main body by welding, so as to provide a seal between the inner member and the pipe main boy. More specifically, a joint area of the inner member and/or the pipe main body is fused by heat, and the inner member and the pipe main body are thermally welded to each other.

The pipe main body and the inner member are both made of the resin materials. Under application of an external impact, for example, due to a collision of a vehicle, the pipe main body and the inner member may thus be deformed about their welded part. This may deteriorate the sealing property at the welded part.

SUMMARY

In order to solve at least part of the problems described above, the invention may be implemented by aspects described below.

(1) According to one aspect of the invention, there is provided a fueling device. The fueling device comprises a passage-forming member made of a weldable resin and configured to form a fuel path connecting to a fuel tank on a filler port side; a fuel path end member made of a resin, located on the filler port side of the fuel path, and welded to the passage-forming member about an axis of the fuel path such as to provide a seal against the passage-forming member by welding about the axis; and a covering member supported outside of an outer peripheral wall of the passage-forming member, such as to cover a welded part about the axis at which the fuel path end member is welded to the passage-forming member from outside of the fuel path with leaving a gap about the axis, which is formed between the welded part and the covering member and is divided into a plurality of sections.

In the fueling device of this aspect, when an external force is applied to the vicinity of the welded part at which the resin fuel path end member is welded to the resin passage-forming member about the axis of the fuel path, the external force first reaches the covering member. Since the covering member is supported outside of the outer peripheral wall to form the gap between the welded part and the covering member, the external force applied up to the welded part between the passage-forming member and the fuel path end member is relieved by deformation of the covering member such as to narrow the gap. The covering member is supported by the outer peripheral wall at positions corresponding to the respective sections of the gap divided into the plurality of sections, such as to cover the welded part. This makes the covering member more likely to relieve the external force. Accordingly, the fueling device of this aspect suppresses deformation about the welded part between the passage-forming member and the fuel path end member and thereby maintains the sealing property at the welded part or suppresses reduction of the sealing property at the welded part. As a result, the fueling device of this aspect prevents leakage of fuel to the outside in the case of a collision of the vehicle.

(2) In the fueling device of the above aspect, the covering member may be arranged to cover the welded part continuously about the axis from outside of the fuel path even at positions between adjacent sections of the gap divided into the plurality of sections, such that sections of the covering member arranged to cover the welded part from outside of the fuel path at the positions between the adjacent sections of the gap may be linked with the outer peripheral wall of the passage-forming member or such that the sections of the covering member arranged to cover the welded part from outside of the fuel path at the positions between the adjacent sections of the gap may be arranged to cover the welded part with leaving a smaller gap than the gap. This configuration has the following advantages. In the fueling device of this aspect, the covering member is arranged to cover the welded part from outside of the fuel path even at the positions between the adjacent sections of the gap divided into the plurality of sections. It is, however, unlikely that the external force limitedly reaches only such sections of the covering member arranged to cover the welded part. The sections of the gap in the neighborhood of the sections of the covering member arranged to cover the welded part are expected to relieve the external force and protect the sections of the covering member. Additionally, the covering member is partly linked with the outer peripheral wall of the passage-forming member or is arranged to partly leave the smaller gap from the outer peripheral wall of the passage-forming member. This enables the shape of the covering member to be kept in the state unaffected by the external force. In the fueling device of this aspect, the covering member may thus be used to hold another attachment component of the fueling device or may be used for fixation to the vehicle.

(3) According to another aspect, there is provided a fueling device. The fueling device comprises a passage-forming member made of a weldable resin and configured to form a fuel path connecting to a fuel tank on a filler port side; a fuel path end member made of a resin, placed on a stepped part of the passage-forming member, which is formed on the filler port side of the fuel path, to be surrounded by a peripheral wall of the stepped part, and welded to the passage-forming member about an axis of the fuel path at the stepped part such as to provide a seal against the passage-forming member by welding about the axis; and a covering member arranged to cover a welded part about the axis at which the fuel path end member is welded to the passage-forming member from outside of the fuel path with leaving a gap about the axis, which is formed between the welded part and the covering member. The covering member is protruded from the peripheral wall of the stepped part of the passage-forming member and supported by the peripheral wall, such as to form the gap from the peripheral wall.

In the fueling device of this aspect, an external force first reaches the covering member, and the covering member is deformed such as to narrow the gap. Accordingly, the fueling device of this aspect also suppresses deformation about the welded part between the passage-forming member and the fuel path end member and thereby maintains the sealing property at the welded part or suppresses reduction of the sealing property at the welded part. As a result, the fueling device of this aspect also prevents leakage of fuel to the outside in the case of a collision of the vehicle.

(4) In the fueling device of the above aspect, the peripheral wall of the stepped part may be arranged to cover the welded part about the axis at the stepped part from outside of the fuel path with leaving a different gap from the gap about the axis. In the fueling device of this aspect, the peripheral wall of the stepped part is deformed such as to narrow the different gap. This configuration further enhances the effectiveness of relieving the external force. As a result, the fueling device of this aspect is further advantageous in terms of suppressing deformation about the welded part and maintaining the sealing property at the welded part or suppressing reduction of the sealing property at the welded part.

(5) In the fueling device of any of the above aspects, the covering member may be integrally molded with the passage-forming member to be cantilevered on the outer peripheral wall. This configuration further facilitates deformation of the covering member such as to narrow the gap and thereby further enhances the effectiveness of relieving the external force. As a result, the fueling device of this aspect is further advantageous in terms of suppressing deformation about the welded part and maintaining the sealing property at the welded part or suppressing reduction of the sealing property at the welded part.

(6) In the fueling device of any of the above aspects, the covering member may be assembled with and mounted to the passage-forming member. In the case that a damage caused by an external force remains within the covering member, a new covering member may replace the damaged covering member and may be retrofitted in the non-damaged passage-forming member. This ensures the effective use of the non-damaged passage-forming member.

(7) In the fueling device of the above aspect, the covering member may have a locking element formed at its insertion-side end. The passage-forming member may have a fitting groove formed in outer circumference of the passage-forming member in a shape corresponding to the locking element. The covering member may be assembled with and mounted to the passage-forming member by engagement of the locking element with the fitting groove. This enables the covering member to be readily retrofitted.

(8) In the fueling device of any of the above aspects, the covering member may be supported by the outer peripheral wall, such as to form the gap in an area expected to receive application of an external force. This configuration simply requires the covering member to be provided over a minimum requirement area such as to be supported by the outer peripheral wall.

(9) In the fueling device of any of the above aspects, the passage-forming member may have a stepped part provided on a filler port side end and formed to have a larger inner diameter than outer diameter of the fuel path end member. The fuel path end member may be welded to the passage-forming member at a bottom of the stepped part. This configuration facilitates positioning of the fuel path end member with respect to the passage-forming member for welding.

BRIEF DESCRIPTION OF DRAWINGS

FIG. 10 is a diagram schematically illustrating the relationship between the mounting location of the fueling device to a vehicle and the area which an external force is applied to;

DESCRIPTION OF EMBODIMENTS

Figure 1:
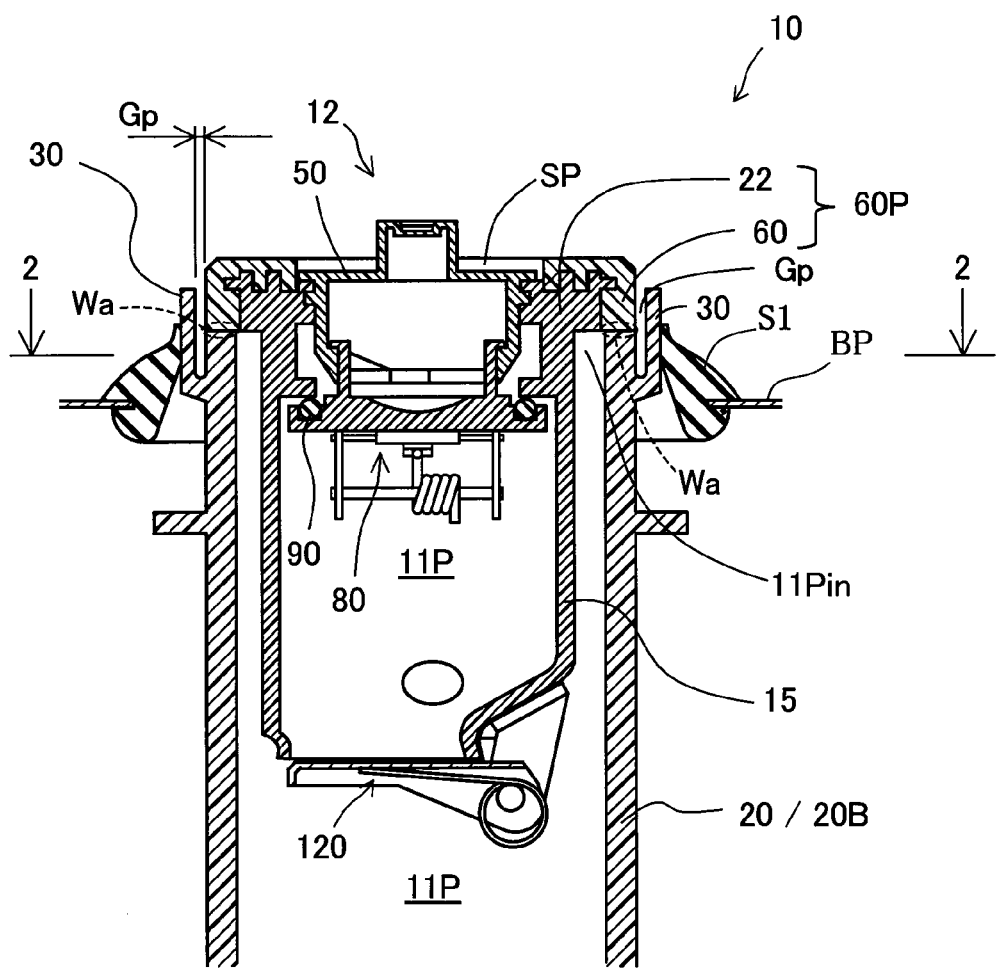
FIG. 1 is a cross sectional view illustrating a fueling device according to one embodiment of the invention.

The following describes some embodiments of the invention with reference to drawings. FIG. 1 is a cross sectional view illustrating a fueling device 10 according to one embodiment of the invention. The fueling device 10 for a fuel tank according to this embodiment has a flow passage-forming member 20 forming a fuel path 11P to be connected with a fuel tank (not shown), and a fuel path open-close mechanism 12 mounted to the passage-forming member 20. The disclosure of U.S. patent application Ser. No. 10/060,343 is hereby incorporated by reference to this application. The fuel path open-close mechanism 12 has a configuration similar to that shown in U.S. patent application Ser. No. 10/060,343 and includes a casing main body 15 mounted to the passage-forming member 20 and configured to have an injection port Sp, a cap main body 50 configured to open and close the injection port Sp, a sealing member 60 placed between the passage-forming member 20 and the casing main boy 15 to seal therebetween air-tightly, a first shutter 80 mounted to inside of the casing main body 15, a seal ring 90 mounted to the first shutter 80 and a second shutter 120 mounted to a lower end of the casing main body 15. The fueling device 10 is used for refueling with a refueling gun (not shown) after removal of the cap main body 10. The detailed description of the respective components constituting the fuel path open-close mechanism 12 are omitted appropriately.

The passage-forming member 20 is a tubular body formed by an appropriate resin molding technique, for example, blow molding, injection molding or extrusion molding and is made of a weldable resin such as high-density polyethylene. The passage-forming member 20 has a covering member 30 protruded from an outer peripheral wall 20B on a filler port side 11Pin of the fuel path 11P. The passage-forming member 20 is supported by a body inner plate BP via an external seal member S1 arranged in close contact with the outer periphery of the covering member 30. The covering member 30 will be described later.

The casing main body 15 is integrated with the sealing member 60 at a flange 22 as a mounting part of the cap main body 50 and is formed of a resin material such as polyacetal or saturated polyester by injection molding. The sealing member 60 is a disk-shaped resin member and is integrally formed with the casing main body 15 by insert molding. The sealing member 60, in combination with the flange 22 of the casing main body 15, constitutes a fuel path end member 60P and is placed on the filler port side 11Pin of the fuel path 11P to be welded to the passage-forming member 20 about an axis of the fuel path 11P. In a welded part Wa about the axis of the fuel path 11P, the sealing member 60 of the fuel path end member 60P provides a seal against the passage-forming member 20. The sealing member 60 is made of a resin thermally weldable to the passage-forming member 20, for example, high-density polyethylene, low-density polyethylene or a resin material containing, for example, polyethylene.

The cap main body 50 is supported on the casing main body 15 to be rotatable by a predetermined angle and is configured to be mountable and demountable by manual operation and to open and close the inlet port Sp of the casing main body 15.

The first shutter 80 is mounted to the casing main body 15 via the seal ring 90 to open and close the fuel path 11P in the casing main body 15. The second shutter 120 is mounted to a lower end opening of the casing main body 15 and serves to make the fuel path 11P in the casing main body 15 communicate with the fuel path 11P in the passage-forming member 20, accompanied with insertion of the refueling gun (not shown). The open-close operations and the assembling process of the fueling device 10 are similar to those described in U.S. patent application Ser. No. 10/060,343 (see US Publication 2002/0092581A) and are thus not described in detail herein.

The welded part Wa is described. The first shutter 80 and the second shutter 120 are assembled to the casing main body 15 integrated with the sealing member 60 and are subsequently assembled to the passage-forming member 20 through the upper side thereof. The sealing member 60 is subsequently integrated with the passage-forming member 20. A procedure of integrating the sealing member 60 with the passage-forming member 20 fuses a lower end face of the sealing member 60 integrated with the casing main body 15 by means of a preheated metal plate and inserting the casing main body 15 into the passage-forming member 20. The sealing member 60 is then thermally welded to the passage-forming member 20 at an upper end face of the outer peripheral wall 20B of the passage-forming member 20. The welding mark forms the welded part Wa. The welded part Wa is formed about the axis of the fuel path 11P.

As described above, the passage-forming member 20 is made of high-density polyethylene, and the casing main body 15 is made of polyacetal that is not thermally welded to the high-density polyethylene. The casing main body 15 integrally and air-tightly linked with the passage-forming member 20 at the welded part Wa about the axis of the fuel path 11P between the sealing member 60 of the fuel path end member 60P and the passage-forming member 20. More specifically, the sealing member 60 of the fuel path end member 60P is integrated on the center side with the casing main body 15 by insert molding and serves to provide a seal against the passage-forming member 20 at the welded part Wa by thermal welding on the outer peripheral side. This configuration ensures the high sealing property at the welded part Wa of the sealing member 60 without requiring any sealing member placed between the passage-forming member 20 and the casing main boy 15.

Figure 2:
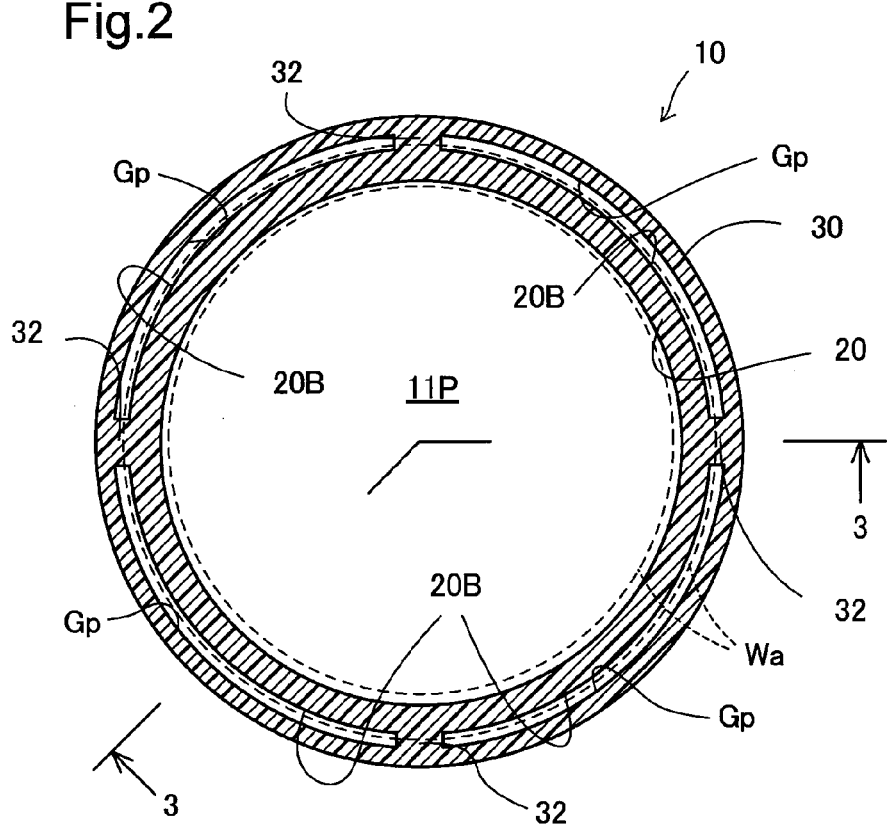
FIG. 2 is a schematic cross sectional view, taken on a line 2-2 in FIG. 1.
Figure 3:
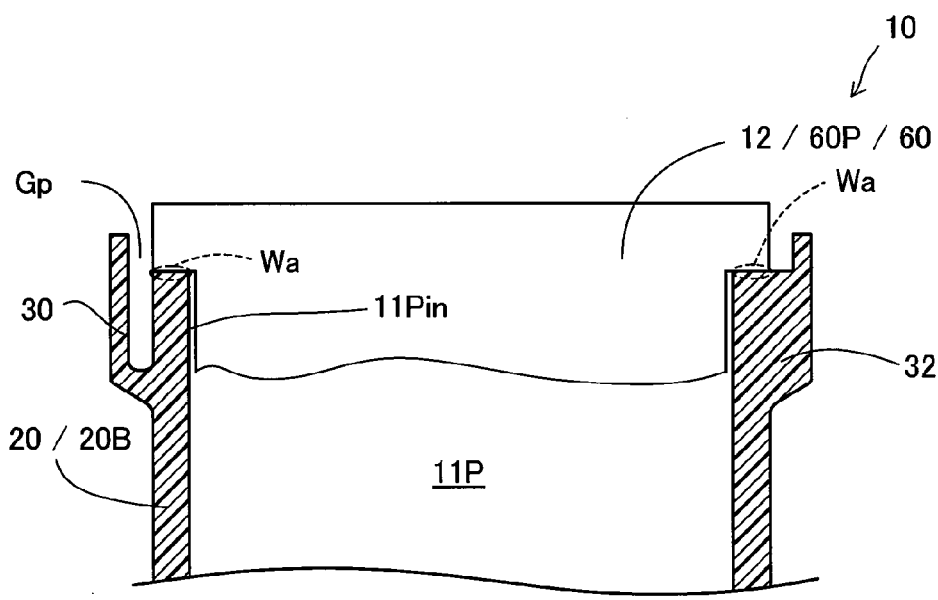
FIG. 3 is a schematic cross sectional view illustrating a main part, taken on a line 3-3 in FIG. 2.

The covering member 30 is described. FIG. 2 is a schematic cross sectional view, taken on a line 2-2 in FIG. 1. FIG. 3 is a schematic cross sectional view illustrating a main part, taken on a line 3-3 in FIG. 2. As shown in FIG. 1, the covering member 30 made of a synthetic resin is arranged to cover the welded part Wa around the axis at which the sealing member 60 of the fuel path end member 60P is welded to the passage-forming member 20 from outside of the fuel path 11P with leaving a gap Gp between the welded part Wa and the covering member 30. As shown in FIG. 2, the gap Gp is divided into four sections about the axis of the fuel path 11P, and the covering member 30 is arranged to cover the welded part Wa from outside of the fuel path 11P with leaving the respective sections of the gap Gp. Additionally, as shown in FIGS. 1 and 3, the covering member 30 is protruded from the outer peripheral wall 20B of the passage-forming member 20, is extended along the outer peripheral wall 20B to form the respective sections of the gap Gp in the axial direction of the fuel path 11P and is cantilevered on the outer peripheral wall 20B. Extending the covering member 30 in this manner makes the depth of the gap Gp in the axial direction of the fuel path 11P greater than the gap Gp. The covering member 30 has linkage sections 32 between the adjacent four sections of the gap Gp and is connected with the outer peripheral wall 20B of the passage-forming member 20 by the linkage sections 32. The covering member 30 is integrally molded with the passage-forming member 20 to be cantilevered on the outer peripheral wall 20B. Any of various techniques, for example, insert molding or two-color molding, may be employed for integral molding of the covering member 30. The gap Gp described above is not necessarily divided into four sections but may be divided into two sections, three sections or five or a greater number of sections.

The fueling device 10 of the embodiment having the configuration described above has the following advantage.

Figure 4:
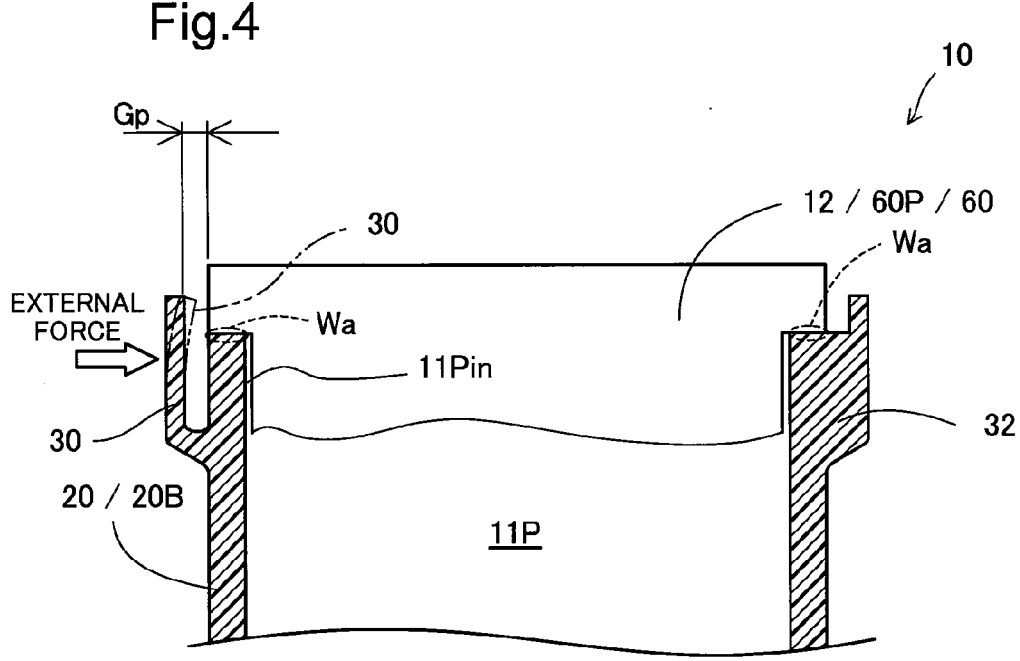
FIG. 4 is a diagram illustrating the advantages of the fueling device.

FIG. 4 is a diagram illustrating the advantages of the fueling device 10. In the fueling device 10 of the embodiment, when an external force is applied to the vicinity of the welded part Wa at which the resin sealing member 60 is welded to the resin passage-forming member 20 about the axis of the fuel path 11P, the external force first reaches the covering member 30. Since the covering member 30 is protruded from the outer peripheral wall 20B of the passage-forming member 20 and is supported by the outer peripheral wall 20B to form the gap Gp between the welded part Wa and the covering member 30, the external force applied up to the welded part Wa between the passage-forming member 20 and the sealing member 60 is relieved by flexural deformation of the covering member 30 such as to narrow the gap Gp, as shown in FIG. 4. Accordingly, the fueling device 10 of the embodiment suppresses deformation about the welded part Wa between the passage-forming member 20 and the sealing member 60 and thereby maintains the sealing property at the welded part Wa or suppresses reduction of the sealing property at the welded part Wa. As a result, the fueling device 10 of the embodiment prevents leakage of the fuel to the outside in the case of a collision of the vehicle.

In the fueling device 10 of the embodiment, the covering member 30 serving to relieve the external force as described above is integrally molded with the passage-forming member 20 and is cantilevered on the outer peripheral wall 20B of the passage-forming member 20. The fueling device 10 of the embodiment makes the covering member 30 more likely to be deformed such as to narrow the gap Gp between the covering member 30 and the welded part Wa. This enhances the effectiveness of relieving the external force. This configuration of the fueling device 10 of the embodiment is more advantageous in terms of suppressing deformation about the welded part Wa and maintaining the sealing property at the welded part Wa or suppressing reduction of the sealing property at the welded part Wa. Additionally, in the fueling device 10 of the embodiment, the covering member 30 is extended along the outer peripheral wall 20B in the axial direction of the fuel path 11P to be cantilevered on the outer peripheral wall 20B. This makes the covering member 30 more likely to be deformed by the external force and enhances the effectiveness of relieving the external force.

Figure 5:
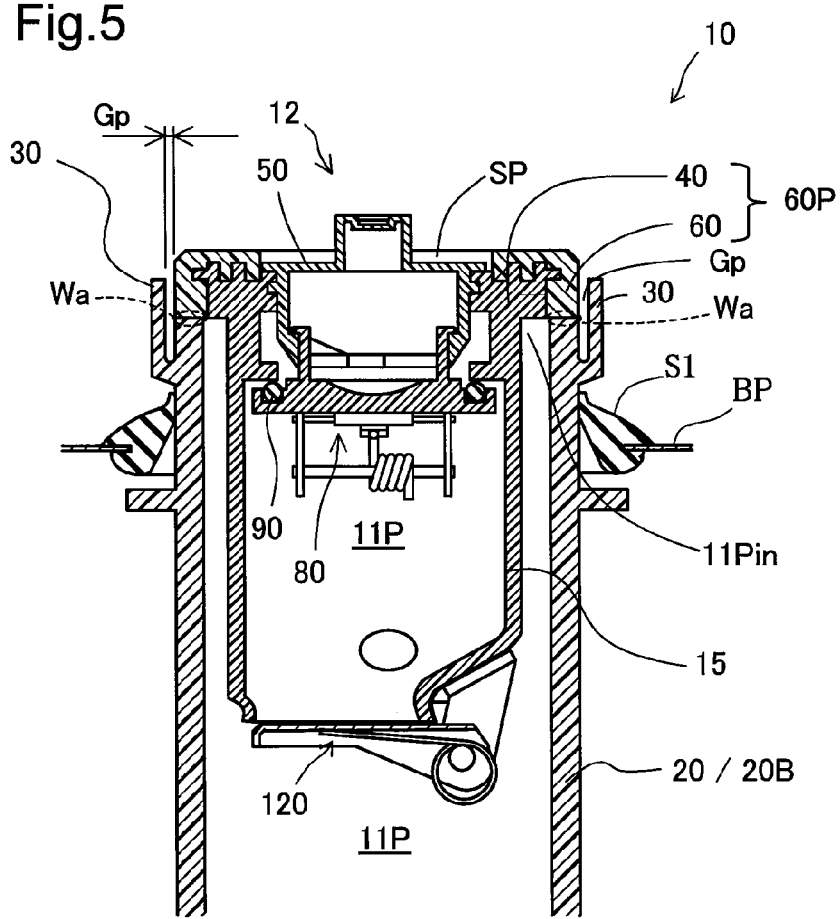
FIG. 5 is a diagram illustrating the state that the fueling device is fixed to a vehicle via an external seal member by a passage-forming member.

In the fueling device 10 of the embodiment, the covering member 30 is linked with the outer peripheral wall 20B of the passage-forming member 20 by means of the linkage sections 32 between the adjacent sections of the gap Gp which is divided into the four sections. It is, however, unlikely that the external force limitedly reaches only the linkage sections 32. The sections of the gap Gp on both sides of each linkage section 32 are expected to relieve the external force and protect the linkage sections 32. Additionally, the covering member 30 is partly linked with the outer peripheral wall 20B of the passage-forming member 20 by means of the linkage sections 32. This configuration enables the shape of the covering member 30 to be kept in the state unaffected by the external force. In the fueling device 10 of the embodiment, as shown in FIG. 1, the covering member 30 may be used for fixation to the vehicle by means of the external seal member S1. The covering member 30 may also be used to hold another attachment component of the fueling device, for example, a cover. The covering member 30 may, however, not be necessarily used for fixation to the vehicle. FIG. 5 is a diagram illustrating the state that the fueling device 10 is fixed to the vehicle via the external seal member S1 by the passage-forming member 20. As shown in FIG. 5, the fueling device 10 fixed to the vehicle similarly enables the covering member 30 to relieve the external force and thereby maintain the sealing property or suppress reduction of the sealing property.

Figure 6:
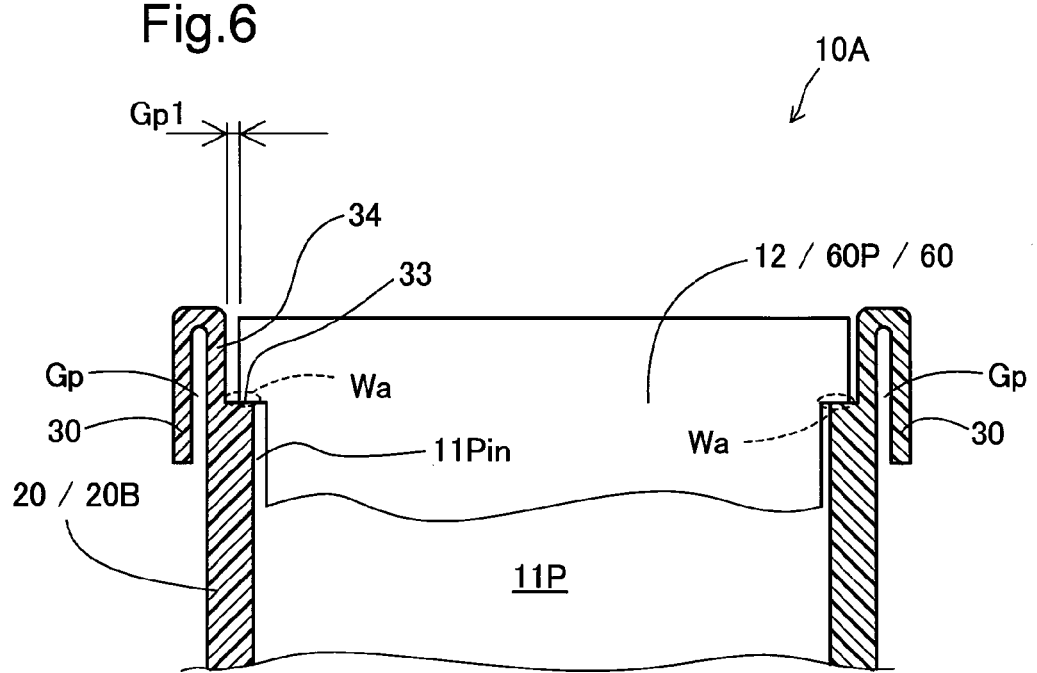
FIG. 6 is a diagram illustrating the cross section of a main part of a fueling device according to a second embodiment.

The following describes other embodiments. FIG. 6 is a diagram illustrating the cross section of a main part of a fueling device 10A according to a second embodiment. As illustrated, the passage-forming member 20 of this fueling device 10A has a stepped part 33 on the filler port side 11Pin of the fuel path 11P. A peripheral wall 34 of the stepped part 33 is arranged to surround the fuel path open-close mechanism 12 or more specifically the sealing member 60 of the fuel path end member 60P. The sealing member 60 is placed on the stepped part 33 and is welded at this stepped part 33 to the passage-forming member 20 about the axis of the fuel path 11P. the sealing member 60 serves to seal against the passage-forming member 20 at the welded part Wa about the axis of the fuel path 11P.

Like the covering member 30 of the fueling device 10 described above, a covering member 30 of the fueling device 10A is arranged to cover the welded part Wa about the axis of the fuel path 11P, which the sealing member 60 is welded to, from the outside of the fuel path 11P with leaving the gap Gp about the axis. Unlike the fueling device 10 described above, however, in the fueling device 10A of this embodiment, the gap Gp is not divided into a plurality of sections about the axis of the fuel path 11P but is continuously formed about the axis of the fuel path 11P. The covering member 30 of the fueling device 10A is folded back and protruded from an upper end of the peripheral wall 34 of the stepped part 33 in the passage-forming member 20, is extended downward (in the drawing) along the outer peripheral wall 20B and is cantilevered on the peripheral wall 34 to form the gap Gp from the peripheral wall 34. The peripheral wall 34 supporting the covering member 30 in this manner is arranged to cover the welded part Wa about the axis at the stepped part 33 from the outside of the fuel path 11P with leaving a gap Gp1, which is different from the gap Gp formed by the covering member 30, about the axis of the fuel path 11P.

In the fueling device 10A shown in FIG. 6, the external force first reaches the covering member 30, and the covering member 30 is deformed such as to narrow the gap Gp. Accordingly, this configuration of the fueling device 10A also suppresses deformation about the welded part Wa between the passage-forming member 20 and the sealing member 60 and thereby maintains the sealing property at the welded part Wa or suppresses reduction of the sealing property at the welded part Wa. As a result, the fueling device 10A of this embodiment also prevents leakage of the fuel to the outside in the case of a collision of the vehicle.

A fueling device includes a resin passage-forming member that forms a fuel path, a fuel path end member, and a covering member. A resin sealing member constituting the fuel path end member is located on a filler port side of the fuel path and is welded to the passage-forming member about an axis of the fuel path to provide a seal. The covering member covers a welded part about the axis at which the sealing member is welded to the passage-forming member from outside of the fuel path with leaving a gap about the axis formed between the welded part and the covering member and into a plurality of sections. The covering member protrudes from an outer peripheral wall of the passage-forming member and is supported by the outer peripheral wall to form the gap. Linkage sections link the covering member with the outer peripheral wall of the passage-forming member.

Figure 7:
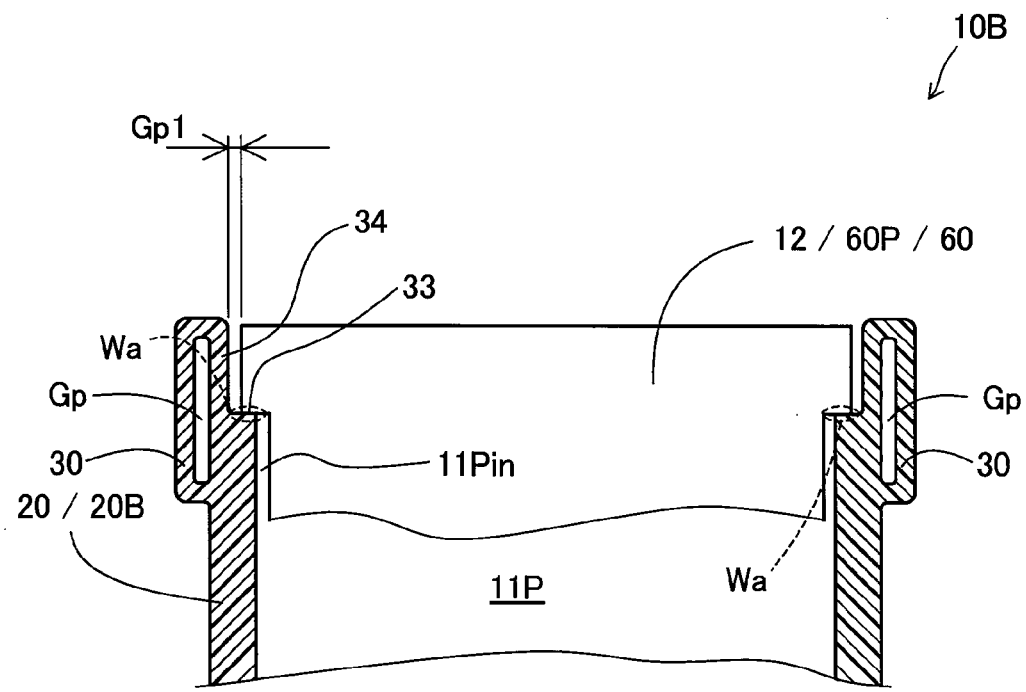
FIG. 7 is a diagram illustrating the cross section of a main part of a fueling device according to a third embodiment.

FIG. 7 is a diagram illustrating the cross section of a main part of a fueling device 10B according to a third embodiment. As illustrated, in this fueling device 10B, the covering member 30 of the fueling device 10A described above is connected with the outer peripheral wall 20B at a lower (in the drawing) edge thereof. Otherwise the configuration of the fueling device 10B is similar to that of the fueling device 10A. This fueling device 10B has the similar advantageous effects to those of the fueling device 10A described above. Additionally, in the fueling device 10B, connecting the lower edge of the covering member 30 with the outer peripheral wall 20B enables the shape of the covering member 30 to be kept in the state unaffected by the external force. Like the fueling device 10 shown in FIG. 1, in the fueling device 10B, the covering member 30 may be used for fixation to the vehicle by means of the external seal member S1 or may also be used to hold another attachment component of the fueling device, for example, a cover. In this embodiment, the covering member 30 may be arranged to surround a gap Gp which may be divided into two sections opposed to each other about the axis of the fuel path 11P.

Figure 8:
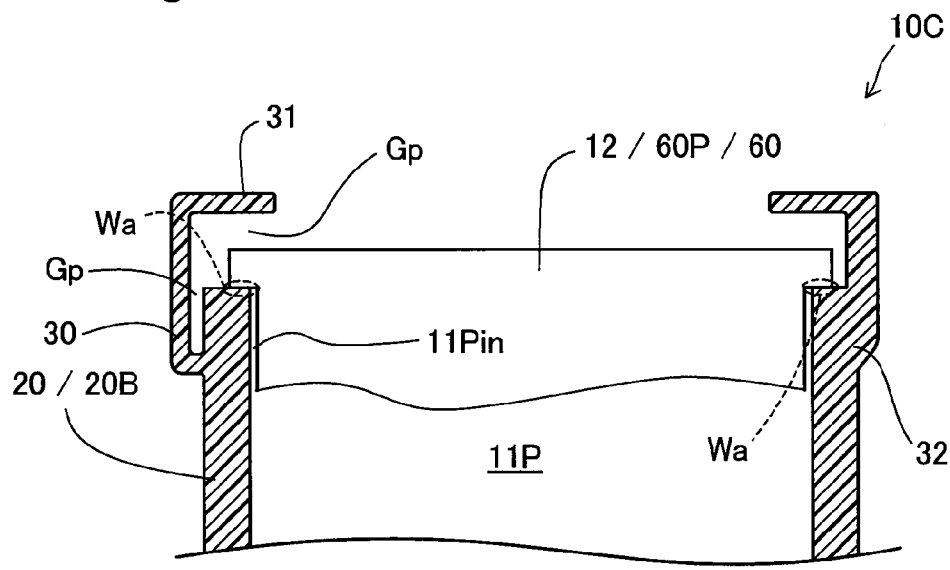
FIG. 8 is a diagram illustrating the cross section of a main part of a fueling device according to a fourth embodiment.

FIG. 8 is a diagram illustrating the cross section of a main part of a fueling device 10C according to a fourth embodiment. As illustrated, in the fueling device 10C, an upper covering member 31 is connected with an upper edge of the covering member 30 of the fueling device 10 described above. Otherwise the configuration of the fueling device 10C is similar to that of the fueling device 10 (shown in FIGS. 1 to 3). The upper covering member 31 is arranged to surround the welded part Wa between the passage-forming member 20 and the sealing member 60 from the upper side about the axis of the fuel path 11P with leaving a gap Gp. This fueling device 10C has the similar advantageous effects to those of the fueling device 10 described above. Additionally, in this fueling device 10C, even when an external force is applied from the upper side of the fueling device 10C up to the welded part Wa, the upper covering member 31 is deformed such as to narrow the gap Gp and thereby relieve the external force. The configuration of this fueling device 10C has the increased flexibility of relieving the external force and is advantageous in terms of maintaining the sealing property at the welded part Wa or suppressing reduction of the sealing property at the welded part Wa. In this embodiment, the linkage sections 32 may be connected with the outer peripheral wall 20B, such that the covering member 30 may be arranged to surround a gap Gp which may be divided into two sections opposed to each other about the axis of the fuel path 11P.

Figure 9:
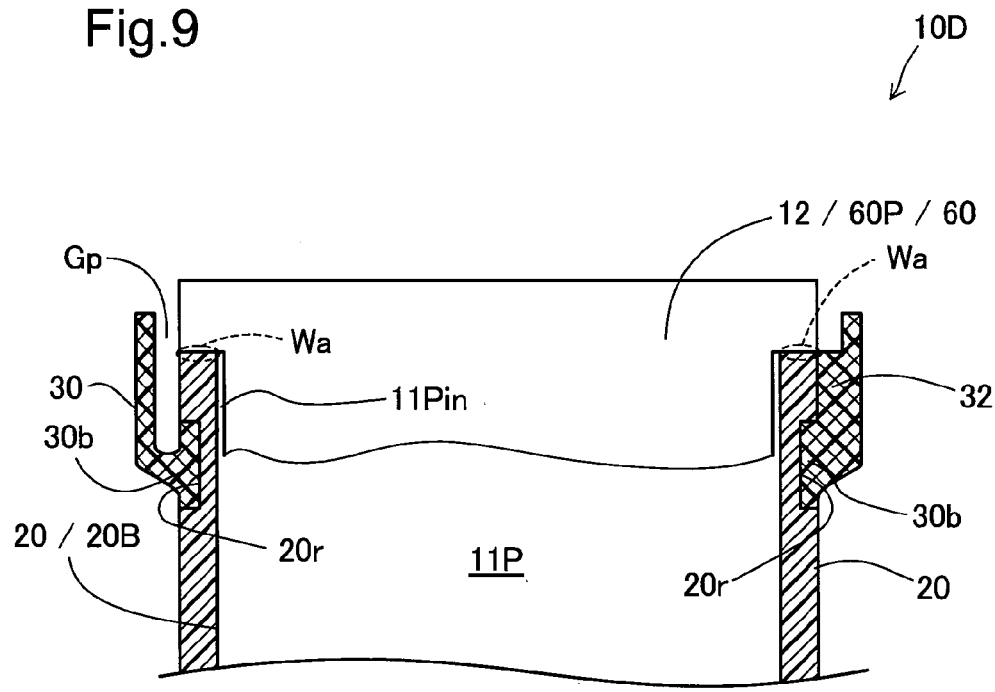
FIG. 9 is a diagram illustrating the cross section of a main part of a fueling device according to a fifth embodiment.

FIG. 9 is a diagram illustrating the cross section of a main part of a fueling device 10D according to a fifth embodiment. As illustrated, this fueling device 10D is characterized by a covering member 30 assembled with and mounted to a passage-forming member 20. More specifically, the fueling device 10D has a fitting groove 20r in a concave shape provided in the passage-forming member 20 and the covering member 30 and linkage sections 32 extended from a fitting base 30b. The fitting base 30b and the covering member 30 extended from the fitting base 30b are made in ring-like forms with partial cutouts. Opening the ring-like form from the partial cutout causes part of the fitting base 30b to be fit in the fitting groove 20r of the passage-forming member 20. Closing the ring-like form to join the respective ends of the cutout causes the fitting base 30b to be entirely fit in the fitting groove 20r. As described above, the covering member 30 is arranged to surround the welded part Wa with leaving a gap Gp, and the linkage sections 32 are connected with the outer peripheral wall 20B of the passage-forming member 20. This fueling device 10D has the similar advantageous effects to those of the fueling device 10 described above. Additionally, in the fueling device 10D, in the case that a damage caused by an external force remains within the covering member 30, a new covering member 30 may replace the damaged covering member 30 and may be retrofitted in the non-damaged passage-forming member 20. This ensures the effective use of the non-damaged passage-forming member 20. The covering member 30 and the fitting base 30b may be made in ring-like forms, and the fitting base 30b may be extended in the axial direction to a similar extent to that of the covering member 30 and may be assembled with the passage-forming member 20 by insertion and fitting into the passage-forming member 20 from an open end of the fitting base 30b.

Figure 10:
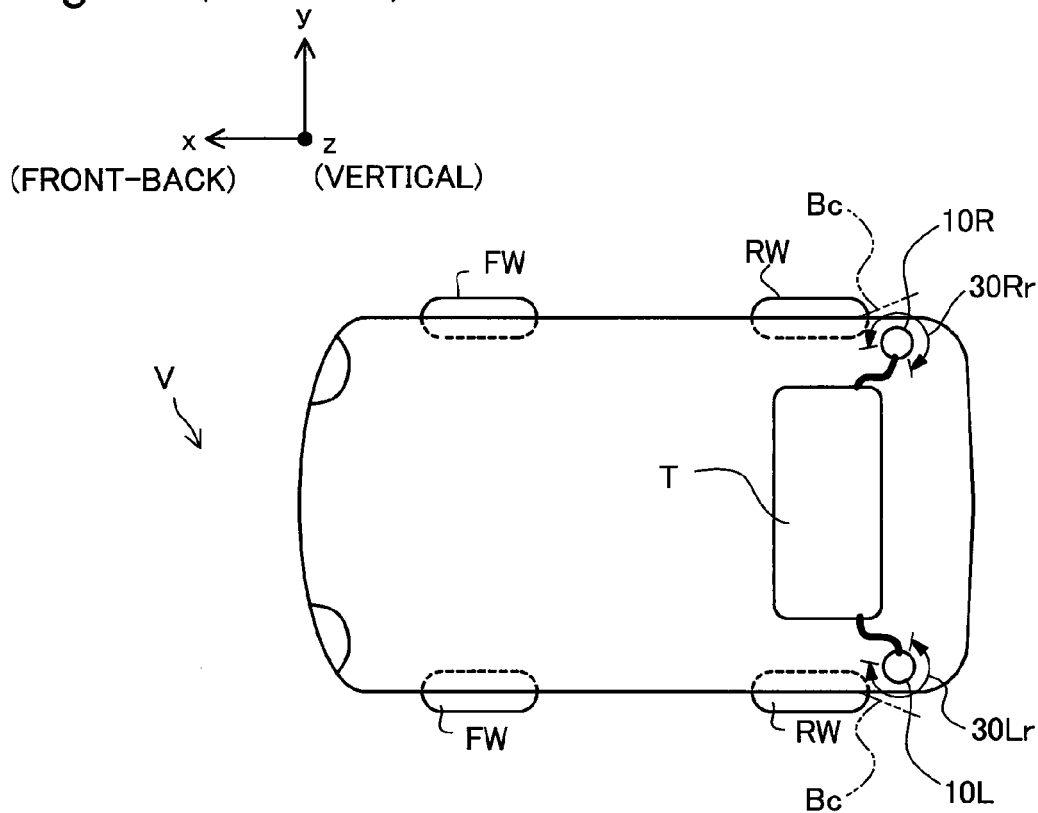

FIG. 10 is a diagram schematically illustrating the relationship between the mounting location of the fueling device 10 to a vehicle V and the area which an external force is applied to. As illustrated, the fueling device 10 may be mounted on the right side or on the left side of the vehicle V with respect to the traveling direction of the vehicle V and is covered with a vehicle body fueling cover Bc to be connected with a fuel tank T from the corresponding vehicle body side. With respect to a fueling device 10R mounted on the right side of the vehicle V, an external force application area 30Rr which an external force is applied to is expected to cover about the fueling device 10R clockwise in the rearward direction on the right side of the vehicle V as illustrated. With respect to a fueling device 10L mounted on the left side of the vehicle V, an external force application area 30Lr which an external force is applied to is expected to cover about the fueling device 10L counterclockwise in the rearward direction on the left side of the vehicle V as illustrated. In the fueling device 10R, the covering member 30 should thus be provided to cover the external force application area 30Rr across the gap Gp. In the fueling device 10L, the covering member 30 should be provided to cover the external force application area 30Lr across the gap Gp. This simply requires the covering member 30 to be provided over a minimum requirement area such as to be supported by the outer peripheral wall 20B.

Figure 11:
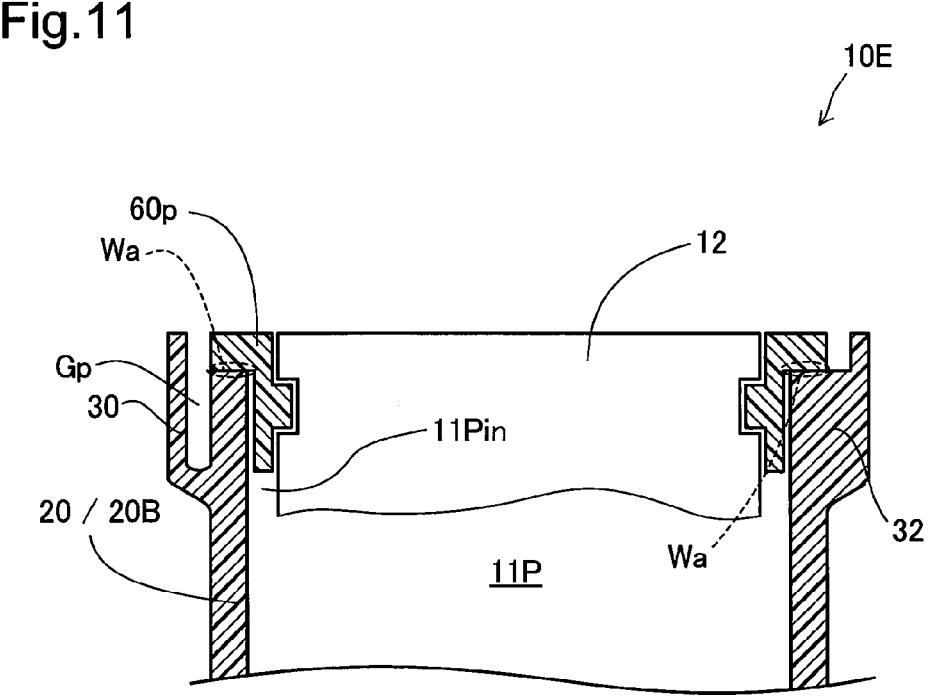
FIG. 11 is a diagram illustrating the cross section of a main part of a fueling device according to a sixth embodiment, in which a fuel path open-close mechanism is held by an opening holding member on a filler port side of a fuel path.

In the respective embodiments described above, the sealing member 60 of the fuel path end member 60P in the fuel path open-close mechanism 12 is welded to the passage-forming member 20. The fuel path open-close mechanism 12, however, has a wide variety of configurations, so that the member welded to the passage-forming member 20 is not limited to the sealing member 60. FIG. 11 is a diagram illustrating the cross section of a main part of a fueling device 10E according to a sixth embodiment, in which the fuel path open-close mechanism 12 is held by an opening holding member 60p on the filler port side 11Pin of the fuel path 11P formed by the passage-forming member 20. As illustrated, this fueling device 10E has the opening holding member 60p located on the filler port side 11Pin and welded to the passage-forming member 20 about the axis of the fuel path 11P to provide a seal against the passage-forming member 20. This opening holding member 60p is arranged to hold the fuel path open-close mechanism 12 air-tightly and is made of a resin thermally weldable to the passage-forming member 20, for example, high-density polyethylene, low-density polyethylene or a resin material containing, for example, polyethylene, like the sealing member 60. This refueling device 10E also has the advantageous effects described above.

Figure 12:
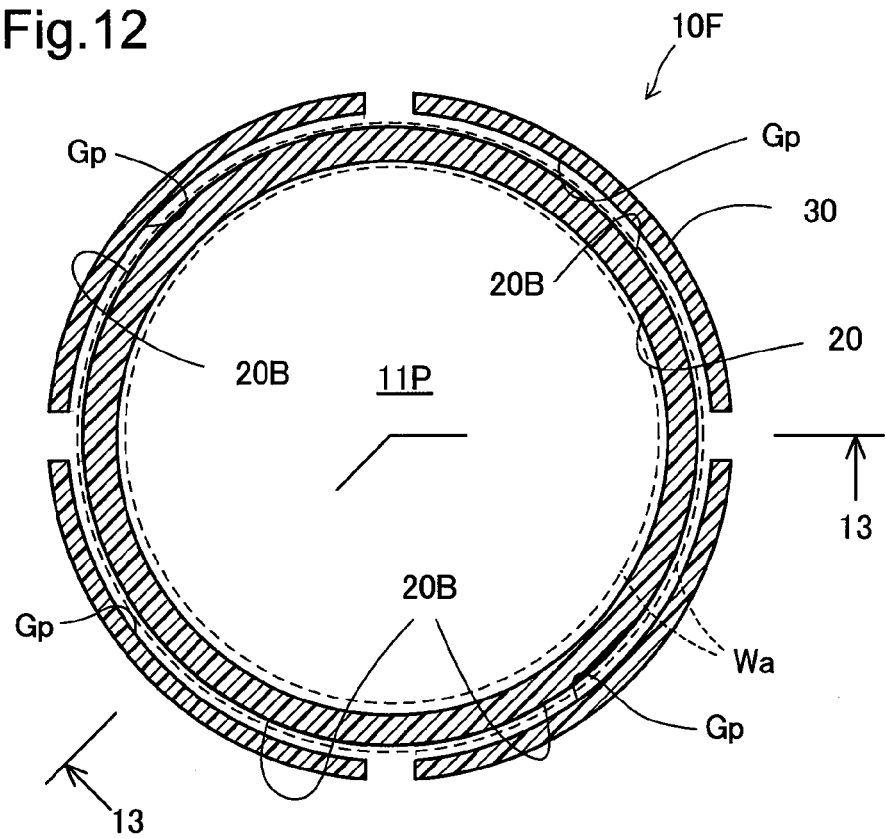
FIG. 12 is a diagram illustrating the cross section of a fueling device according to a seventh embodiment, similar to the cross section of FIG. 2.
Figure 13:
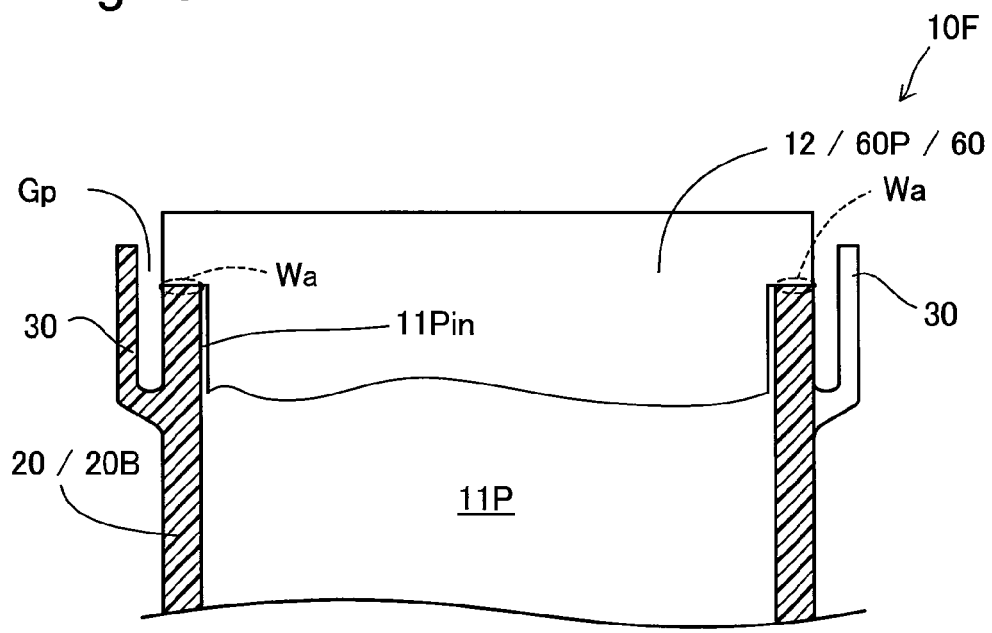
FIG. 13 is a schematic cross sectional view illustrating a main part, taken on a line 13-13 in FIG. 12.

FIG. 12 is a diagram illustrating the cross section of a fueling device 10F according to a seventh embodiment, similar to the cross section of FIG. 2. FIG. 13 is a schematic cross sectional view illustrating a main part, taken on a line 13-13 in FIG. 12. As illustrated, the fueling device 10F is characterized by the configuration that only covering members 30 are used to cover a gap Gp divided into a plurality of sections. More specifically, the fueling device 10F does not have linkage sections 32. This configuration causes the welded part Wa to be covered by the individual covering members 30 over the extent of the respective sections of the gap Gp from the outside of the fuel path 11P with leaving the gap Gp. The covering members 30 are protruded from the outer peripheral wall 20B and are supported by the outer peripheral wall 20B. The configuration of this fueling device 10F ensures deformation of the individual covering members 30 by an external force and thereby enhances the reliability in relieving the external force.

Figure 14:
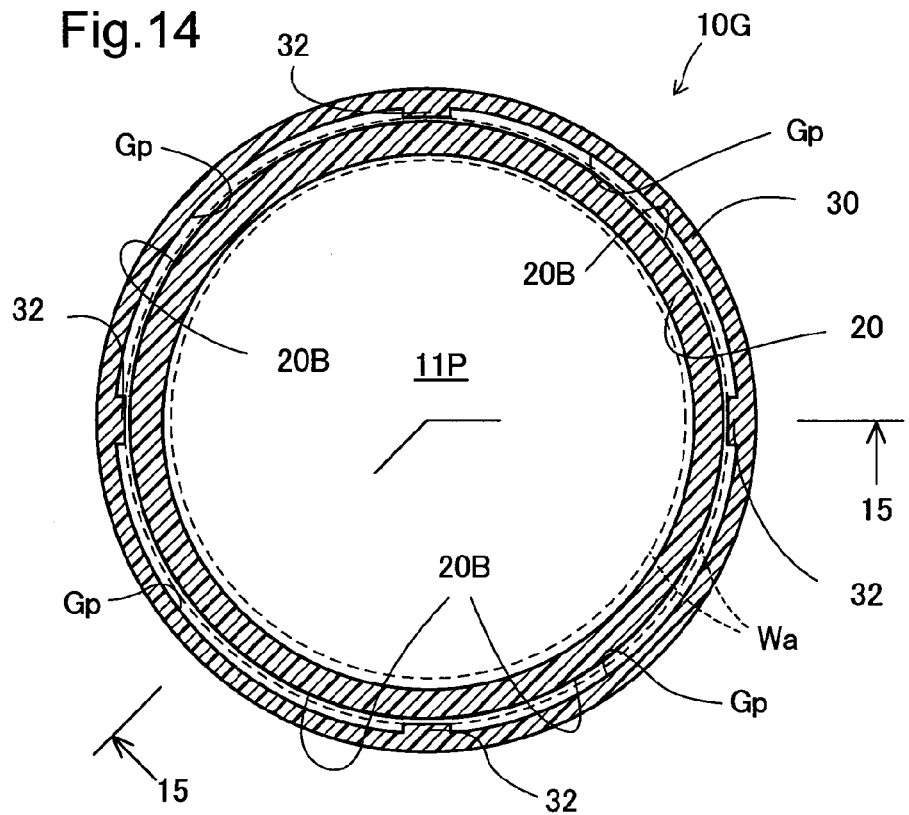
FIG. 14 is a diagram illustrating the cross section of a fueling device according to an eighth embodiment, similar to the cross section of FIG. 2.
Figure 15:
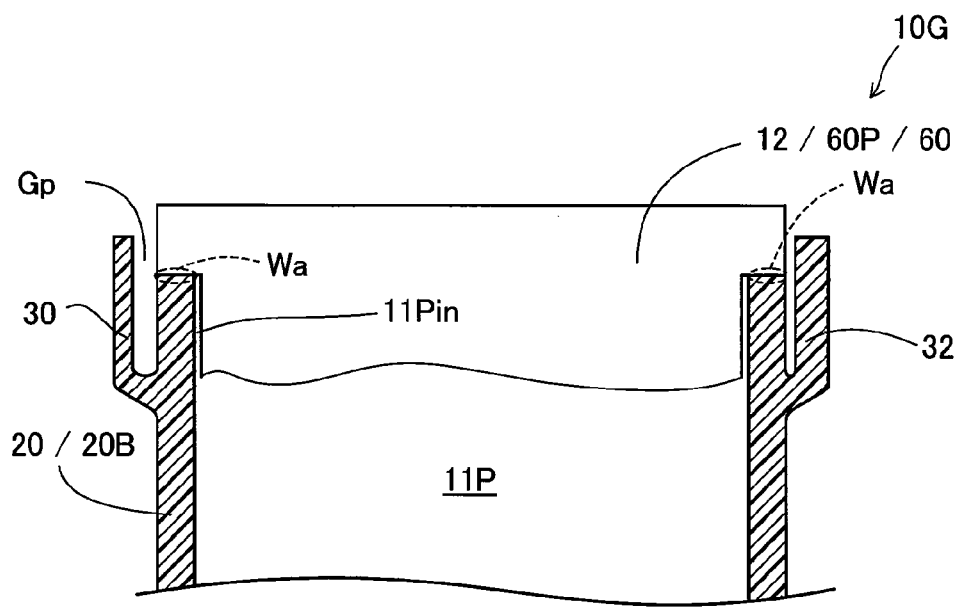
FIG. 15 is a schematic cross sectional view illustrating a main part, taken on a line 15-15 in FIG. 14.

FIG. 14 is a diagram illustrating the cross section of a fueling device 10G according to an eighth embodiment, similar to the cross section of FIG. 2. FIG. 15 is a schematic cross sectional view illustrating a main part, taken on a line 15-15 in FIG. 14. As illustrated, the fueling device 10G is characterized by the configuration that the welded part Wa is covered with leaving a smaller gap than a gap Gp at linkage sections 32 between adjacent sections of the gap Gp. This fueling device 10G has the similar advantageous effects of the fueling device 10 described above. According to a modification, the linkage sections 32 may be formed in a shape continuous with the covering member 30 arranged to cover the welded part Wa with leaving the gap Gp. Convexes or protrusions may be protruded from the outer wall surface of the outer peripheral wall 20B toward the inner wall surface of the linkage sections 32 to cover the welded part Wa with leaving a smaller gap than the gap Gp.

Figure 16:
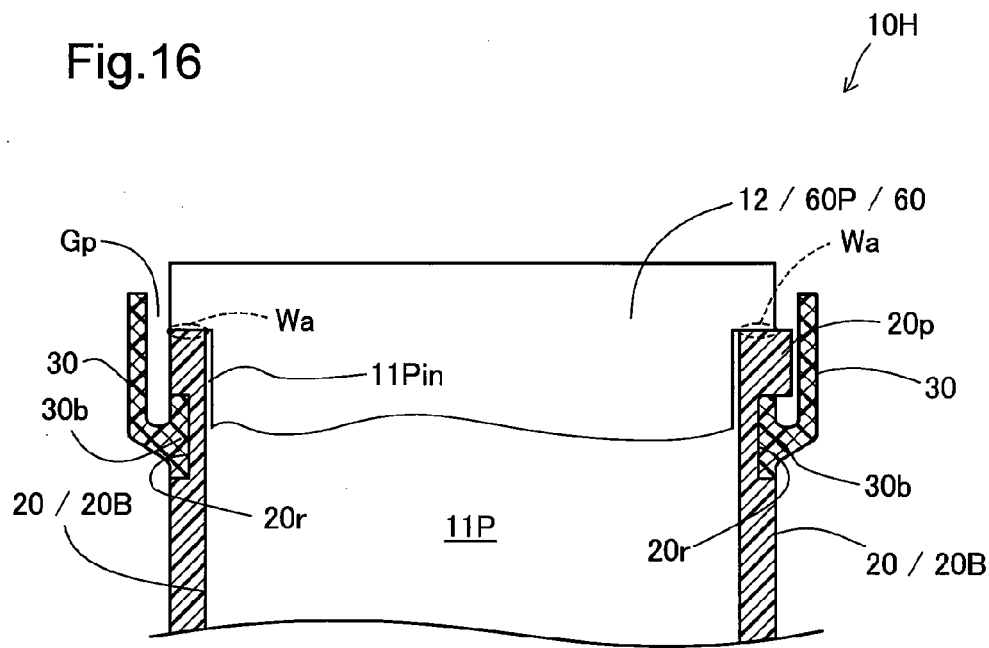
FIG. 16 is a diagram illustrating the cross section of a fueling device as a modification of the fueling device shown in FIG. 9.

FIG. 16 is a diagram illustrating the cross section of a fueling device 10H as a modification of the fueling device 10D shown in FIG. 9. As illustrated, like the fueling device 10D shown in FIG. 9, in the fueling device 10H, the fitting base 30b is fit in the fitting groove 20r formed in the passage-forming member 20, so that the covering member 30 may be retrofitted in the passage-forming member 20. Additionally, in the fueling device 10H, convexes 20P are protruded from the outer wall surface of the outer peripheral wall 20B toward the inner wall surface of the covering member 30 on an upper end filler port side of the passage-forming member 20. These convexes 20P are formed to be protruded between adjacent sections of the gap Gp. This fueling device 10H has the additional advantageous effect of allowing for replacement of the covering member 30, in addition to the advantageous effects similar to those of the fueling device 10 described above. The covering member 30 may be configured to be replaceable like the above embodiment, but may alternatively be configured to be unreplaceable and fixed to the passage-forming member 20 by, for example, bonding. The fitting base 30b may be fixed in the fitting groove 20r by means of another member such as a pin or a wire.

Figure 17:
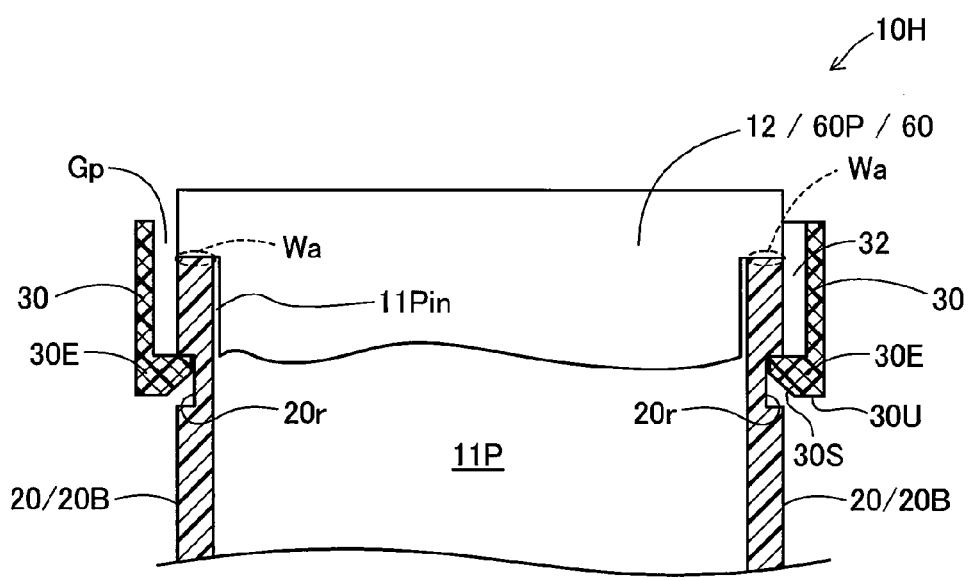
FIG. 17 is a diagram illustrating another configuration that enables the covering member shown in FIG. 16 to be retrofitted in a passage-forming member.

FIG. 17 is a diagram illustrating another configuration that enables the covering member 30 shown in FIG. 16 to be retrofitted in the passage-forming member 20. As illustrated, in this modification, after an end of the passage-forming member 20 is connected with the fuel path end member 60P of the fuel path open-close mechanism 12 at the welded part Wa, the covering member 30 is arranged to cover the welded part Wa from an opening end side. A locking element 30E is formed on the inner side of a lower section 30U of the covering member 30. The locking element 30E is formed to have a slightly smaller inner diameter than the outer diameter of the passage-forming member 20. Additionally, a sloped surface 30S is formed on an inner lower end of the covering member 30. The covering member 30 is made of a synthetic resin and may be placed over an edge section of the passage-forming member 20 and inserted downward (in the drawing) accompanied with some deformation. The covering member 30 has the sloped surface 30S on its lower end and is thus readily inserted. When the locking element 30E reaches the fitting groove 20r provided in the passage-forming member 20, the locking element 30E is fit in the fitting groove 20r by the elasticity of the covering member 30 itself, so that the covering member 30 is engaged with the passage-forming member 20.

The configuration of this modification includes the other components of the covering member 30, i.e., the gap Gp divided into a plurality of sections and the linkage sections 32, like the first embodiment. This configuration serves to relieve an external force applied from outside. Additionally, the configuration of this modification allows for easy mounting of the covering member 30 and makes the covering member unlikely to be unintentionally demounted. The locking element 30E may be provided for each of the linkage sections 32. A number of the locking elements 30E may further be provided, in addition to those provided for the linkage sections 32. The locking element 30E may be provided in a continuous form around the peripheral of the lower section of the covering member 30. The engagement element 30E may be formed to be harder than the other components of the covering member 30. The lower section of the covering member 30 may have any structure serving as a locking element that is not demounted unless application of a predetermined strength of force after insertion into the passage-forming member 20. For example, the sloped surface 30S may be a planar surface or a curved surface. The engagement element 30E may be formed as an insert of another material such as metal.

The fitting groove 20r which the locking element 30E is engaged with is formed as the groove having the approximately rectangular cross sectional shape in the axial direction in the above embodiment as illustrated. The fitting groove 20r may, however, be formed as a groove having any cross sectional shape that allows the engagement element 30E to be fit in, for example, a trapezoidal cross sectional shape. In the application that provides the engagement element 30E for each of the linkage sections 32, the fitting groove 20r may not be necessarily provided around the entire circumference of the passage-forming member 20 but may be provided only at positions corresponding to the engagement elements 30E. This configuration locates the covering member 30 with respect to the circumference of the passage-forming member 20 and serves as the rotation lock of the covering member 30.

In the above modification, the covering member 30 is made of a synthetic resin to be deformable and causes the engagement element 30E to be fit in the fitting groove 20r by its own elasticity. According to another modification, the engagement element 30E may be made of a material having a small amount of deformation. An insertion groove which the engagement element 30E is inserted in may be formed along the axial direction. The covering member 30 may be inserted with alignment of the engagement element 30E with the insertion groove and rotated around the circumference of the passage-forming member 20, so that the engagement element 30E may be engaged with the fitting groove 20r.

Figure 18:
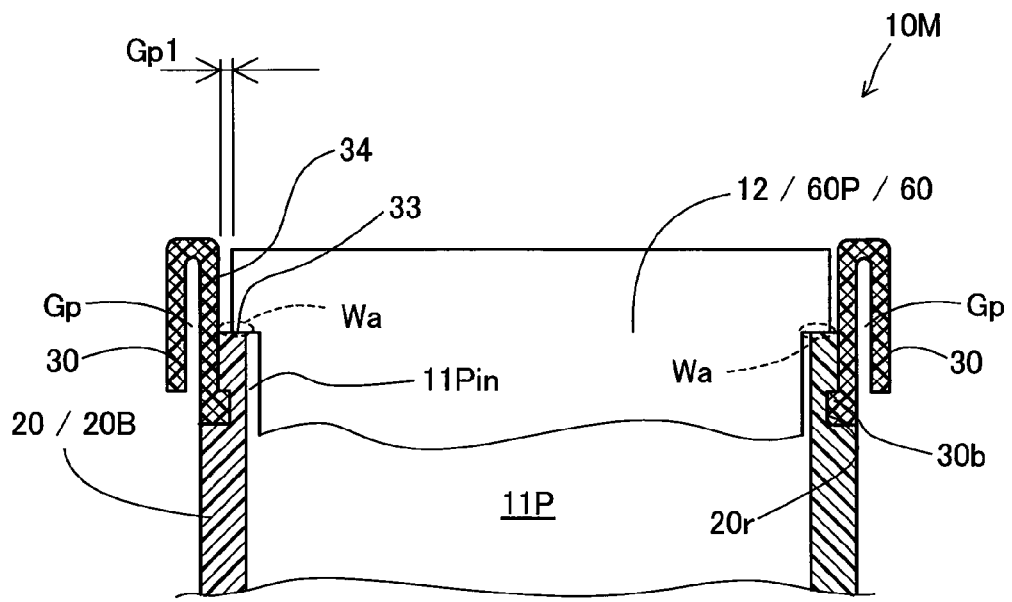
FIG. 18 is a diagram illustrating the cross section of a fueling device as a modification of the fueling device shown in FIG. 6 to have a retrofittable structure.

FIG. 18 is a diagram illustrating the cross section of a fueling device 10M as a modification of the fueling device 10A shown in FIG. 6 to have a retrofittable structure. As illustrated, in the fueling device 10M, the covering member 30 extended from the peripheral wall 34 as described above has a fitting base 30b formed at a lower end of the peripheral wall 34. The fitting base 30b is fit in the fitting groove 20r of the passage-forming member 20. This configuration has the additional advantageous effect of allowing for replacement of the covering member 30, in addition to the advantageous effects similar to those of the fueling device 10A described above.

Figure 19:
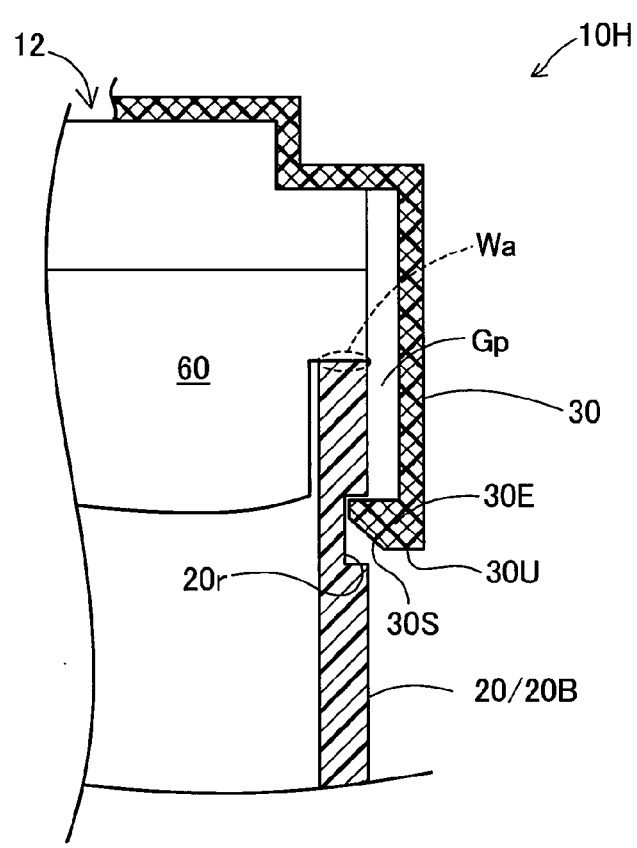
FIG. 19 is a diagram illustrating the cross section of a main part of a fueling device, in which a covering member is arranged to cover the entire fuel path open-close mechanism.

The structures shown in FIGS. 16 to 18 are not limited to the configuration that the covering member 30 is arranged to cover only the periphery of the passage-forming member 20 but may also be applied to the configuration that the covering member 30 is arranged to cover the entire fuel path open-close mechanism 12 as illustrated in FIG. 19. In this modification, the covering member 30 may be provided as part of an opening-forming member of a capless structure. In the capless structure, an insertion-side open-close mechanism, in place of the cap, may be provided in the upstream of the fuel path open-close mechanism 12 including the first shutter 80 shown in FIG. 1, and an opening-forming member and a cover member may be provided to place the insertion-side open-close mechanism therein. The covering member 30 may be formed at the lower end of the opening-forming member.

The invention is not limited to any of the embodiments and the modifications described above but may be implemented by a diversity of other configurations without departing from the scope of the invention. For example, the technical features of any of the embodiments and the modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

In the embodiments described above, the fuel path open-close mechanism 12 is configured to have the cap main body 50. According to a modification, a capless-type fuel path open-close mechanism 12 without a cap may be provided on the filler port side 11Pin by welding of the sealing member 60 of the fuel path end member 60P or the opening holding member 60p to the passage-forming member 20.

In the fueling device 10A shown in FIG. 6 and the fueling device 10B shown in FIG. 7, the gap Gp is not divided into a plurality of sections about the axis of the fuel path 11P, but the covering member 30 is arranged to cover the welded part Wa from the outside of the fuel path 11P. According to a modification, the gap Gp may be divided into a plurality of sections about the axis of the fuel path 11P, like the fueling device 10 shown in FIGS. 1 to 3.

Figure 20:
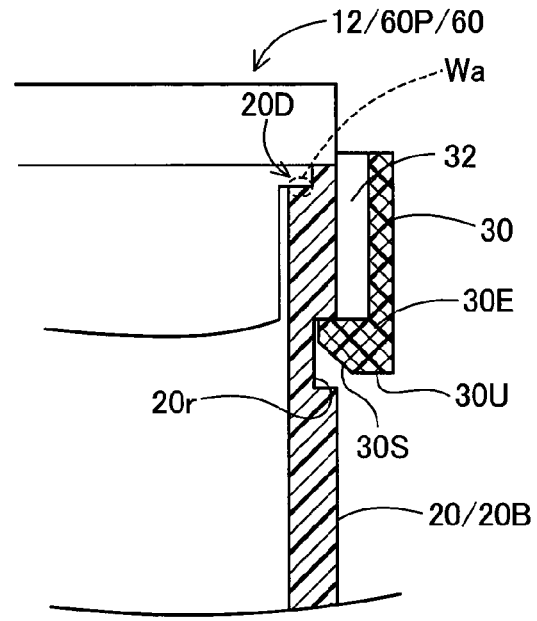
FIG. 20 is a diagram illustrating a modified configuration in which a stepped part is provided on an upper end face of a passage-forming member and a sealing member is fit in the stepped part.
Figure 21:
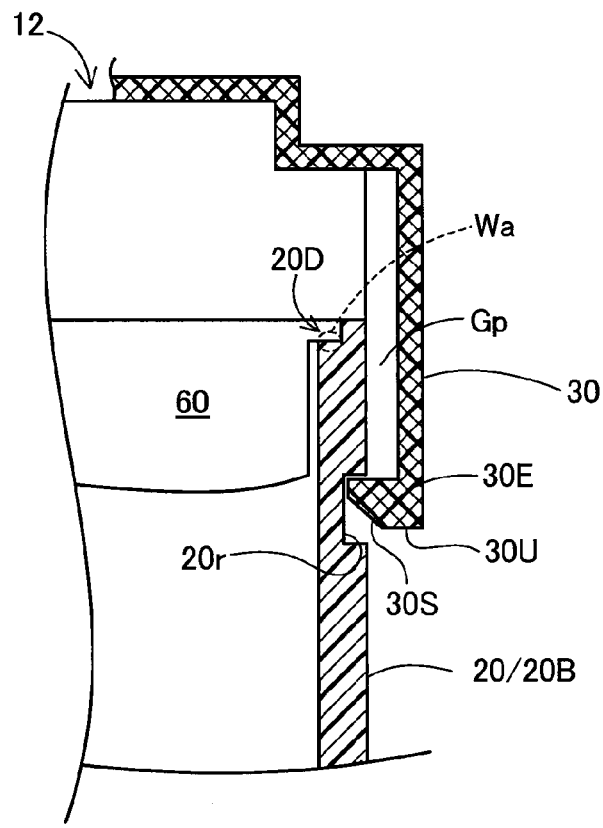
FIG. 21 is a diagram illustrating a modified configuration of FIG. 19, in which a stepped part is provided on an upper end face of a passage-forming member and a sealing member is fit in the stepped part.

In the embodiments and the modifications described above, the upper end face of the passage-forming member 20 which the sealing member 60 is welded is made flat. As shown in FIGS. 20 and 21, however, a stepped part 20D may be provided on the upper end face of the passage-forming member 20, and the sealing member 60 may be fit in the stepped part 20D. The sealing member 60 is welded after being fit in the stepped part 20D. In this modification, making the inner diameter of the stepped part 20D slightly larger than the outer diameter of the sealing member 60 facilitates positioning of the sealing member 60 with respect to the passage-forming member 20 for welding. In this configuration, an external force is transmitted only via the stepped part 20 of the passage-forming member 20 arranged to surround the fuel path open-close mechanism 12. Accordingly, compared with the configurations of the first to the eighth embodiments and their modifications, this configuration suppresses transmission of the external force to the welded part Wa and makes the welded part Wa unlikely to be deformed or damaged.

The gap Gp is formed as a cavity in the embodiments and the modifications described above, but may be filled with a material softer than the material of the covering member 30. For example, the gap Gp may be filled with polyurethane foam. In another example, in the course of formation of the covering member 30, the material of the covering member 30 may be foamed at the position of the gap Gp. The material filled in the gap Gp may be an elastic material that is restored after deformation of the covering member 30 by an external force or may be a deformable material that is not restored after the deformation. In another example, a liquid or a gel may be sealed in the gap Gp and may be moved through the gap Gp under application of an external force.

The covering member 30 is made of a synthetic resin in the embodiments and the modifications described above but may be made of an elastic material such as natural rubber or synthetic rubber. The linkage sections 32 of the covering member 30 may not be necessarily formed along the axial direction of the passage-forming member 20 but may be formed obliquely. The linkage sections 32 may not be necessarily formed as protrusions having a fixed length in a predetermined direction but may be provided as a number of projections protruded in the radial direction of the passage-forming member 20. The projections may be formed in any of various shapes, for example, a columnar shape such as circular cylindrical shape or rectangular columnar shape, a frustum shape such as truncated cone shape or truncated pyramid shape, a tubular shape such as cylindrical shape, or a dome shape. The linkage sections 32 may have any configuration that ensures formation of the gap Gp. For example, the covering member 30 may have the inner periphery formed in a concavo-concave shape, in place of the linkage sections 32. In another example, a separate linkage member from the covering member 30 may be provided in place of the linkage sections 32. Any of such linkage structure may not be necessarily linked with the passage-forming member 20 like the illustrated example of FIG. 14 but may have any configuration that ensures formation of the gap Gp between the passage-forming member 20 and the covering member 30.

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A fueling device that supplies a fuel to a fuel tank, comprising:
   a passage-forming member made of a weldable resin and configured to form a fuel path connecting to the fuel tank on a filler port side;

a fuel path end member made of a resin, located on the filler port side of the fuel path, and attached to the passage-forming member about an axis of the fuel path to provide a seal against the passage-forming member by welding about the axis; and a covering member supported outside of an outer peripheral wall of the passage-forming member to cover a welded part and from outside of the fuel path leaving a gap about the axis, which is formed between the welded part and the covering member and is divided into a plurality of sections, wherein the covering member is arranged to cover the welded part continuously about the axis from outside of the fuel path even at positions between adjacent sections of the gap divided into the plurality of sections, such that sections of the covering member arranged to cover the welded part from outside of the fuel path at the positions between the adjacent sections of the gap are linked with the outer peripheral wall of the passage-forming member or such that the sections of the covering member arranged to cover the welded part from outside of the fuel path at the positions between the adjacent sections of the gap are arranged to cover the welded part with leaving a smaller gap than the gap.

2. The fueling device according to claim 1, wherein the covering member is integrally molded with the passage-forming member to be cantilevered on the outer peripheral wall.

3. The fueling device according to claim 2, wherein the covering member is assembled with and mounted to the passage-forming member.

4. The fueling device according to claim 3, wherein the covering member has a locking element formed at its insertion-side end, the passage-forming member has a fitting groove formed in outer circumference of the passage-forming member in a shape corresponding to the locking element, and the covering member is assembled with and mounted to the passage-forming member by engagement of the locking element with the fitting groove.

5. The fueling device according to claim 1, wherein the covering member is integrally molded with the passage-forming member to be cantilevered on the outer peripheral wall.

6. The fueling device according to claim 1, wherein the covering member is assembled with and mounted to the passage-forming member.

7. The fueling device according to claim 1, wherein the covering member has a locking element formed at its insertion-side end, the passage-forming member has a fitting groove formed in outer circumference of the passage-forming member in a shape corresponding to the locking element, and the covering member is assembled with and mounted to the passage-forming member by engagement of the locking element with the fitting groove.

8. The fueling device according to claim 1, wherein the covering member is supported by the outer peripheral wall, to form the gap in an area expected to receive application of an external force.

9. The fueling device according to claim 1, wherein the passage-forming member has a stepped part provided on a filler port side end and formed to have a larger inner diameter than outer diameter of the fuel path end member, and the fuel path end member is attached to the passage-forming member at a bottom of the stepped part.

10. A fueling device that supplies a fuel to a fuel tank, comprising:

a passage-forming member made of a weldable resin and configured to form a fuel path connecting to the fuel tank on a filler port side;

a fuel path end member made of a resin, placed on a stepped part of the passage-forming member, which is formed on the filler port side of the fuel path, to be surrounded by a peripheral wall of the stepped part, and attached to the passage-forming member about an axis of the fuel path at the stepped part to provide a seal against the passage-forming member by welding about the axis; and a covering member arranged to cover a welded part about the axis at which the fuel path end member is attached to the passage-forming member from outside of the fuel path leaving a gap about the axis, which is formed between the welded part and the covering member, wherein the covering member is protruded from the peripheral wall of the stepped part of the passage-forming member and is supported by the peripheral wall, such that to form the gap from the peripheral wall.

11. The fueling device according to claim 10, wherein the peripheral wall of the stepped part is arranged to cover the welded part about the axis at the stepped part from outside of the fuel path leaving a different gap from the gap about the axis.

12. The fueling device according to claim 11, wherein the covering member is integrally molded with the passage-forming member to be cantilevered on the outer peripheral wall.

13. The fueling device according to claim 12, wherein the covering member is assembled with and mounted to the passage-forming member.

14. The fueling device according to claim 13, wherein the covering member has a locking element formed at its insertion-side end, the passage-forming member has a fitting groove formed in outer circumference of the passage-forming member in a shape corresponding to the locking element, and the covering member is assembled with and mounted to the passage-forming member by engagement of the locking element with the fitting groove.

15. The fueling device according to claim 10, wherein the covering member is integrally molded with the passage-forming member to be cantilevered on the outer peripheral wall.

16. The fueling device according to claim 10, wherein the covering member is assembled with and mounted to the passage-forming member.

17. The fueling device according to claim 10, wherein the covering member has a locking element formed at its insertion-side end, the passage-forming member has a fitting groove formed in outer circumference of the passage-forming member in a shape corresponding to the locking element, and the covering member is assembled with and mounted to the passage-forming member by engagement of the locking element with the fitting groove.

18. The fueling device according to claim 10, wherein the covering member is supported by the outer peripheral wall to form the gap in an area expected to receive application of an external force.

19. The fueling device according to claim 10,
wherein the passage-forming member has a stepped part provided on a filler port side end and formed to have a larger inner diameter than outer diameter of the fuel path end member, and
the fuel path end member is attached to the passage-forming member at a bottom of the stepped part.

\* \* \* \* \*